(12) United States Patent
Chang et al.

(10) Patent No.: US 9,058,208 B2
(45) Date of Patent: Jun. 16, 2015

(54) METHOD OF SCHEDULING TASKS FOR MEMORIES AND MEMORY SYSTEM THEREOF

(71) Applicant: Skymedi Corporation, Hsinchu (TW)

(72) Inventors: Yu-Tang Chang, Hsinchu (TW); Yi-Chun Liu, Hsinchu (TW)

(73) Assignee: Skymedi Corporation, Hsinchu Science Park, Hsinchu (TW)

( * ) Notice: Subject to any disclaimer, the term of this patent is extended or adjusted under 35 U.S.C. 154(b) by 238 days.

(21) Appl. No.: 13/674,106

(22) Filed: Nov. 12, 2012

(65) Prior Publication Data

US 2014/0137128 A1   May 15, 2014

(51) Int. Cl.
*G06F 9/48* (2006.01)
*G06F 3/06* (2006.01)
*G06F 13/16* (2006.01)

(52) U.S. Cl.
CPC ........ *G06F 9/4881* (2013.01); *G06F 2209/486* (2013.01); *G06F 3/061* (2013.01); *G06F 3/0625* (2013.01); *G06F 3/0659* (2013.01); *G06F 3/0679* (2013.01); *G06F 13/1642* (2013.01); *Y02B 60/1246* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 6,061,709 | A  * | 5/2000 | Bronte | 718/103 |
| 7,155,716 | B2 * | 12/2006 | Hooman et al. | 718/102 |
| 2001/0007559 | A1 * | 7/2001 | Le Pennec et al. | 370/392 |
| 2002/0191555 | A1 * | 12/2002 | Borst et al. | 370/329 |

* cited by examiner

*Primary Examiner* — Emerson Puente
*Assistant Examiner* — Jonathan R Labud
(74) *Attorney, Agent, or Firm* — Winston Hsu; Scott Margo

(57) ABSTRACT

A method of scheduling a plurality of tasks for a plurality of memories in a memory system is disclosed. The method includes classifying each task among the plurality of tasks to a task type among a plurality of task types, disposing a plurality of task queues according to the plurality of task types wherein each task queue stores tasks to be executed within the plurality of tasks, assigning a priority for each task type among the plurality of task types, disposing at least one execution queue; and converting a first task stored in a first task queue among the plurality of task queues into at least one command to be stored in a first execution queue among the at least one execution queue, wherein the at least one command is executed according to the priority of a first task type corresponding to the first task queue.

21 Claims, 10 Drawing Sheets

METHOD OF SCHEDULING TASKS FOR MEMORIES AND MEMORY SYSTEM THEREOF

BACKGROUND OF THE INVENTION

1. Field of the Invention

The present invention relates to a method of scheduling a plurality of tasks for a plurality of memories and memory system thereof, and more particularly, to a method and memory system capable of assigning a priority to the plurality of tasks to execute the plurality of tasks in an optimized order, so as to improve efficiency of the memory system.

2. Description of the Prior Art

A memory controller is commonly utilized for task management in a memory system, especially in a non-volatile memory system. In general, since data stored in a non-volatile memory system may not be lost after electric power of the non-volatile memory system is cut off, the non-volatile memory system becomes an important means to store system data. Among those non-volatile memory systems, NAND flash memory, which has advantages of low power and high speed, becomes popular with the popularization of portable devices in recent years.

However, the NAND flash memory has several drawbacks. For example, each block in the NAND flash memory has an upper limit of access times; besides, data can not be written into a block directly without erasing the block first. In order to overcome these drawbacks, the controller for the NAND flash memory should perform several tasks, such as wear leveling, garbage collection, bad block management, etc. Therefore, the memory controller plays an important role in the NAND flash memory. There are many tasks for the controller of the NAND flash memory to execute. In general, most of the tasks can be classified into four main task types: user data access, metadata management, wear leveling control, and garbage collection. User data access is the access to user data for basic operation, such as read and write. Metadata management is to manage the location for user data access in the memory, e.g. to use a table for mapping which block has data and which block is empty and could be utilized for accessing user data. Wear leveling is to move frequently-modified data to seldom-utilized block and to move seldom-modified data to frequently-utilized block, so as to utilize each block equally to avoid some blocks being damages due to frequent utilization since each block in the NAND flash memory has an upper limit of access times. Garbage collection is to collect usable data in a block before erasing the block.

Please refer to FIG. 1, which is a schematic diagram of a conventional memory system 10. As shown in FIG. 1, the memory system 10 includes a flash memory controller 100 and a flash memory array 150. The flash memory controller 100 communicates with the flash memory array 150 via a flash memory interface. The flash memory controller 100 also communicates with a host device via a host interface, wherein the host device may be a processor or a server required to access data in the memory system 10. The memory controller 100 includes a flash translation layer (FTL) 110 and a physical driver 120. The FTL 110 is utilized for transferring instructions from the host device to the tasks of task types 112A-112D, which can be executed in the flash memory. The FTL 110 further includes an arbitration unit 114, which is utilized for managing and coordinating the tasks. The physical driver 120 is utilized for driving each flash memory in the flash memory array 150 to execute the tasks. All of the flash memories are arranged in the flash memory array 150. The columns in the flash memory array 150 are denoted by channels Ch0-Ch3, and the flash memories in each channel are controlled by enable pins CE0-CE3. Therefore, the channels Ch0-Ch3 and the enable pins CE0-CE3 can be utilized for accessing the memories in the flash memory array 150. Each time the physical driver 120 needs to drive a specific memory, an enable pin corresponding to the specific memory is enabled, and a task can be executed in the specific memory.

According to the above structure, when the host device makes an instruction, the FTL 110 receives the instruction and assigns a task to be executed. The arbitration unit 114 then monitors the physical driver 120. In general, when the physical driver 120 is available, the arbitration unit 114 accesses the physical driver 120 to drive a specific memory in the flash memory array 150 to execute the task. On the other hand, when the physical driver 120 is busy, the task should wait until the former task is complete and then can be executed. Therefore, the performance of the flash memory 10 may be affected and unable to maintain a substantial throughput for a user. Thus, there is a need for improvement of the prior art.

SUMMARY OF THE INVENTION

It is therefore an objective of the present invention to provide a method and memory system capable of assigning a priority to the plurality of tasks to execute the plurality of tasks in an optimized order, so as to improve efficiency of the memory system.

The present invention discloses a method of scheduling a plurality of tasks for a plurality of memories in a memory system. The method comprises classifying each task among the plurality of tasks to a task type among a plurality of task types, disposing a plurality of task queues according to the plurality of task types wherein each task queue stores tasks which are of one of the plurality of task types and to be executed within the plurality of tasks, assigning a priority for each task type among the plurality of task types, disposing at least one execution queue, and converting a first task stored in a first task queue among the plurality of task queues into at least one command to be stored in a first execution queue among the at least one execution queue, wherein the at least one command in the first execution queue is executed according to the priority of a first task type corresponding to the first task queue.

The present invention further discloses a memory system. The memory system comprises a plurality of memories, and a memory controller wherein a program embodied in the memory controller is executed by a processor to perform a method of scheduling a plurality of tasks for the plurality of memories in the memory system. The method comprises classifying each task among the plurality of tasks to a task type among a plurality of task types, disposing a plurality of task queues according to the plurality of task types wherein each task queue stores tasks which are of one of the plurality of task types and to be executed within the plurality of tasks, assigning a priority for the each task type among the plurality of task types, disposing at least one execution queue, and converting a first task stored in a first task queue among the plurality of task queues into at least one command to be stored in a first execution queue among the at least one execution queue, wherein the at least one command in the first execution queue is executed according to the priority of a first task type corresponding to the first task queue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
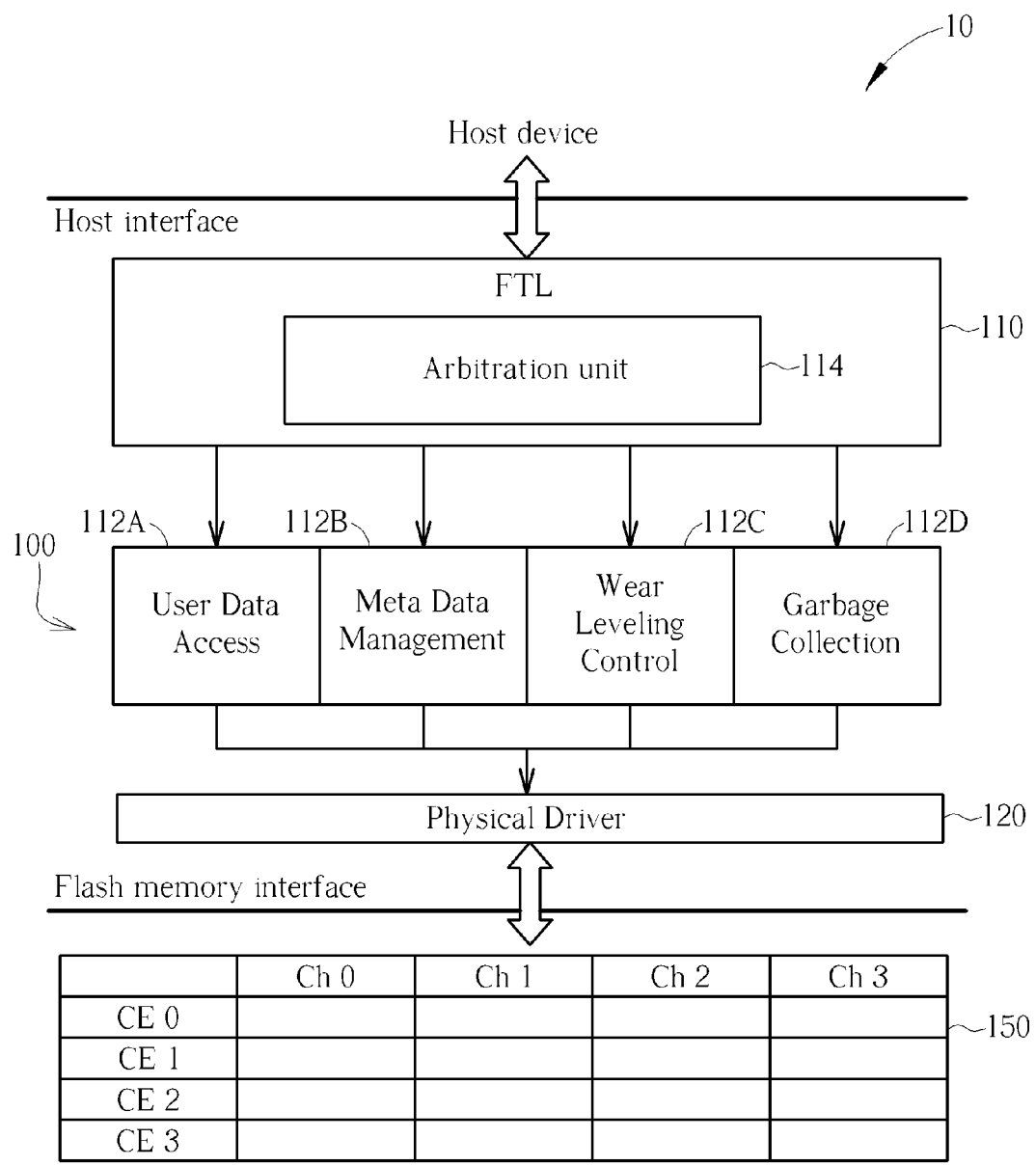
FIG. 1 is a schematic diagram of a conventional flash memory.
Figure 2:
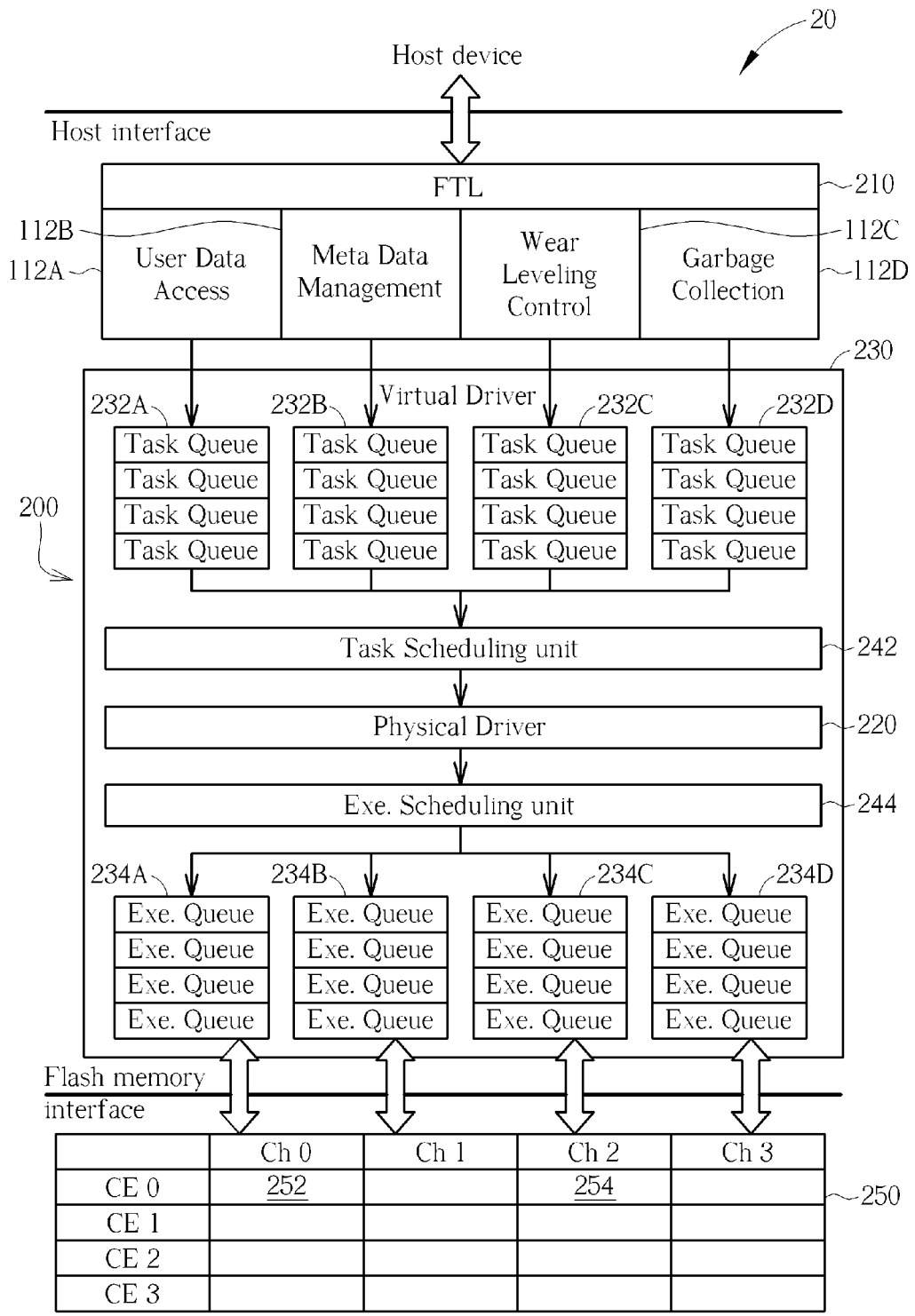
FIG. 2 is a schematic diagram of a flash memory according to an embodiment of the present invention.

Please refer to FIG. 2, which is a schematic diagram of a memory system 20 according to an embodiment of the present invention. As shown in FIG. 2, the memory system 20 includes a flash memory controller 200 and a flash memory array 250. The same as those in the memory system 10, the flash memory controller 200 communicates with the flash memory array 250 via a flash memory interface. The flash memory controller 200 also communicates with a host device via a host interface, wherein the host device may be a processor or a server required to access data in the memory system 20. The flash memory array 250 is similar to the flash memory array 150. Since there are four columns and four rows in the flash memory array 250, channels Ch0-Ch3 and enable pins CE0-CE3 are utilized for accessing the flash memories in the flash memory array 250. In other embodiments, there may be any number of columns and any number of rows in a flash memory array, and hence any number of channels and any number of enable pins may be utilized. In some embodiments, one memory corresponding to a channel and an enable pin may be related to several memory units (e.g. logical unit number). At this moment, a more specific enable signal should be utilized for accessing a specific memory unit among these memory units.

Figure 3:
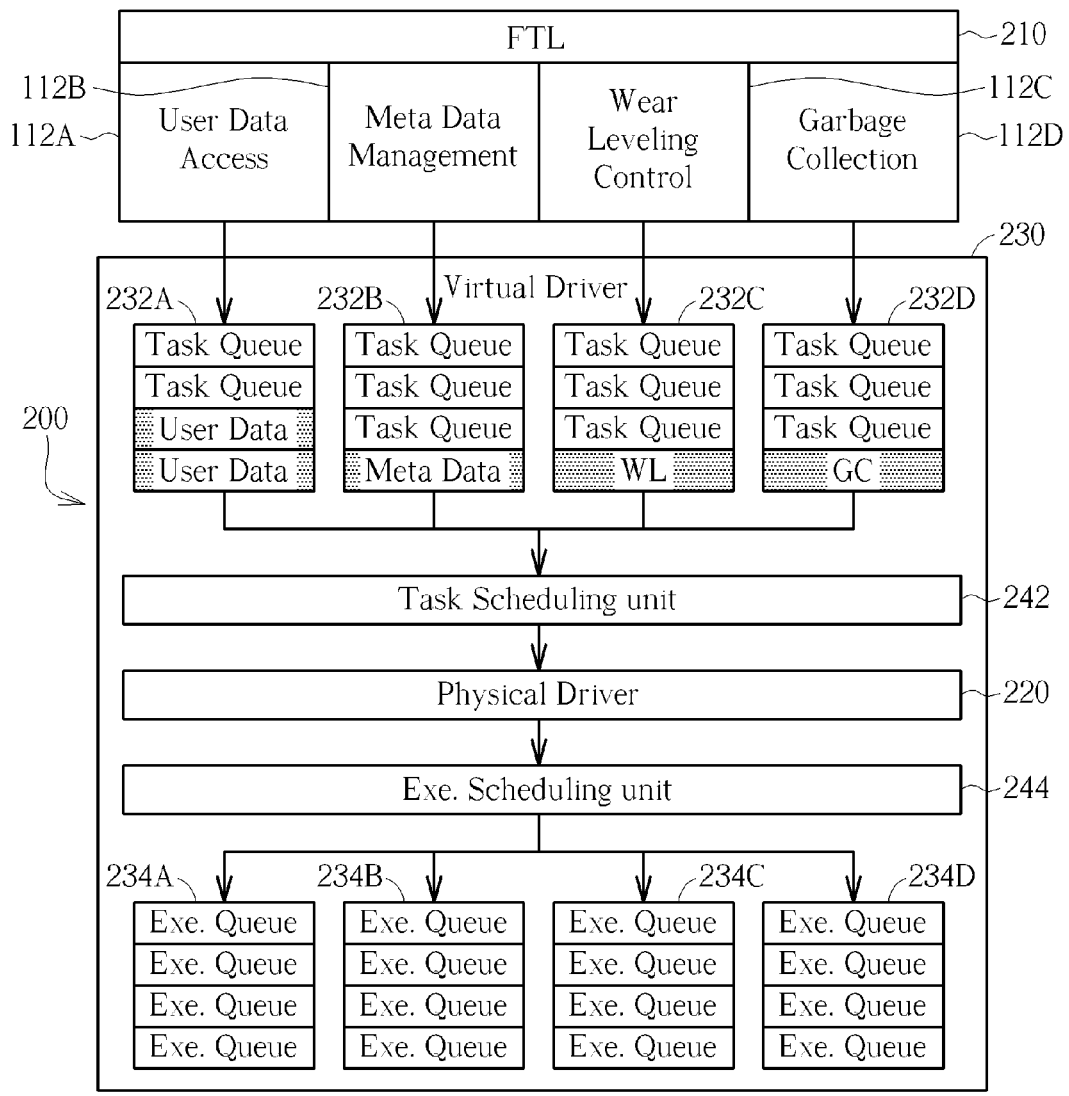
FIG. 3 is a schematic diagram of tasks stored in the task queues according to an embodiment of the present invention.

Please keep referring to FIG. 2. As shown in FIG. 2, the main difference between the memory system 20 and the memory system 10 is "the flash memory controller". In the flash memory controller 200, the arbitration unit 114 is omitted and a virtual driver 230 is included. The virtual driver 230 includes a physical driver 220, task queues 232A-232D, execution queues 234A-234D, a task scheduling unit 242, and an execution scheduling unit 244. The physical driver 220 is similar to the physical driver 120. The task queues 232A-232D are utilized for storing tasks. Each task queue corresponds to a task type, and stores tasks which are of the task type and to be executed. For example, please refer to FIG. 3, which is a schematic diagram of tasks stored in the task queues 232A-232D. As shown in FIG. 3, two tasks of user data access 112A are to be executed and stored in the task queue 232A, one task of metadata management 112B is to be executed and stored in the task queue 232B, one task of wear leveling control 112C is to be executed and stored in the task queue 232C, and one task of garbage collection 112D is to be executed and stored in the task queue 232D. The classification of the four task types in the memory system 20 is one of feasible embodiments. In some embodiments, tasks can be classified in any manners. Therefore, there may be any number of task types, and thus there may be any number of task queues corresponding to the task types. In a general NAND flash memory, most of the tasks can be classified into the four task types of user data access 112A, metadata management 112B, wear leveling control 112C, and garbage collection 112D, and thus the classification of the task types 112A-112D is utilized as the embodiment in the memory system 20. The task scheduling unit 242 is coupled to each of the task queues 232A-232D, for determining task priority and transferring a task among the task types 112A-112D into commands to be stored in the execution queues 234A-234D.

Figure 4:
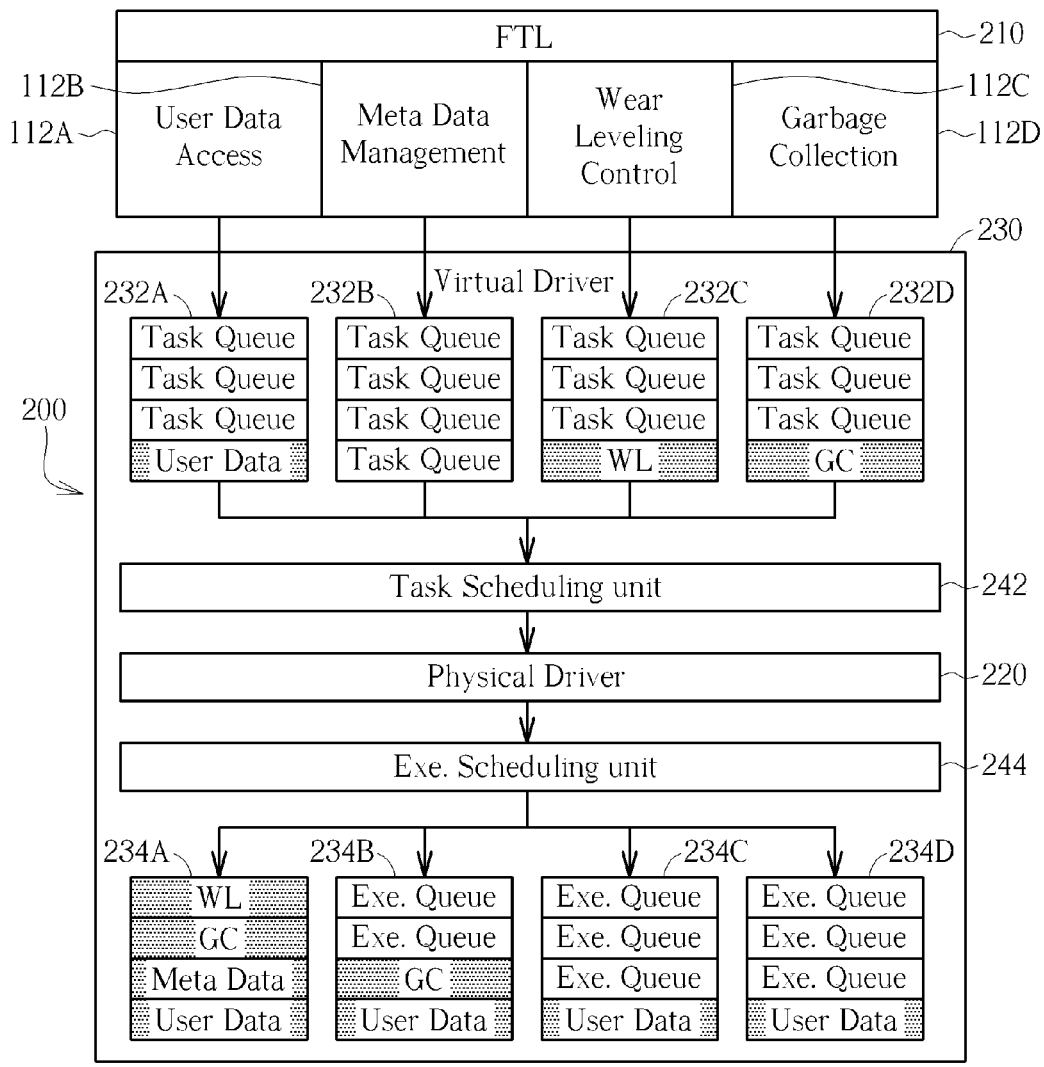
FIG. 4 is a schematic diagram of commands stored in the execution queues according to an embodiment of the present invention.

On the other hand, the execution scheduling unit 244 is coupled to the physical driver 220, for allocating bandwidth to the commands in the execution queue according to the task priority. The execution queues 234A-234D are utilized for storing commands executable for memories in the flash memory array 250, wherein the executable commands are converted from those tasks to be executed by the task scheduling unit 242 and stored in the task queues 232A-232D. Each execution queue among the four execution queues 234A-234D corresponds to a channel among the four channels Ch0-Ch3, and stores commands executable for memories in the channel. For example, please refer to FIG. 4, which is a schematic diagram of commands stored in the execution queues 234A-234D. As shown in FIG. 4, one command of wear leveling control 112C, one command of garbage collection 112D, one command of metadata management 112B, and one command of user data access 112A are stored in the execution queue 234A, one command of garbage collection 112D and one command of user data access 112A are stored in the execution queue 234B, one command of user data access 112A is stored in the execution queue 234C, and one command of user data access 112A is store in the execution queue 234D. The disposition of the four execution queues 234A-234D is one of feasible embodiments. In some embodiments, since there may be any number of columns in a flash memory array, and hence any number of channels may be utilized. Therefore, any number of execution queues may be implemented in the virtual driver 230 corresponding to the number of channels in the flash memory array 250.

In detail, each task is classified into one of the task types 112A-112D. When a task is to be executed, it is placed in a task queue among the task queues 232A-232D corresponding to the task type of the task. After the tasks to be executed are queued up in the task queues 232A-232D, the virtual driver 230 converts the tasks to be executed into the executable commands according to a priority of the task types. Each task may be converted into at least one executable command by the task scheduling unit 242 and placed in at least one execution queue among the execution queues 234A-234D by the execution scheduling unit 244. For example, as shown in FIG. 2, if a task of wear leveling control 112C includes moving a data from a memory space 252 to a memory space 254, the task may be converted into two commands: reading the data from the memory space 252 and writing the data into the memory space 254. Therefore, the reading command may be placed in the execution queue 234A, and the writing command may be placed in the execution queue 234C. Then the physical driver 220 may execute the reading command and the writing command in order, to complete the task of wear leveling control 112C.

In general, a flash memory has a throughput for data transfer across the flash memory interface. For example, if the throughput of the memory system 20 is 10 MB/s, the bandwidth of the memory system 20 is also 10 MB/s. On the other hand, each task type among the task types 112A-112D also has a throughput of occupying the bandwidth of the memory system 20 when the tasks of the task type are executed by the physical driver 220. If a sum of the throughputs of the task types 112A-112D is smaller than the throughput of the memory system 20, all of the tasks in the task queues 232A-232D can be executed successfully. If a sum of the throughputs of the task types 112A-112D is greater than the throughput of the memory system 20, several tasks should wait in the task queues 232A-232D or the execution queues 234A-234D and can not be executed in time. Therefore, a priority should be applied to determine which tasks could be executed first, to execute all of the tasks in an optimized order, so as to improve efficiency of the memory system 20.

For example, suppose the bandwidth of the memory system 20 is 10 MB/s. The throughput of the tasks of user data access 112A is denoted by U MB/s, the throughput of the tasks of metadata management 112B is denoted by M MB/s, the throughput of the tasks of wear leveling control 112C is denoted by W MB/s, and the throughput of the tasks of garbage collection 112D is denoted by G MB/s. If $U+M+W+G<=10$, all of the tasks in the task queues 232A-232D can be executed successfully. If $U+M+W+G>10$, several tasks should wait in the task queues 232A-232D or the execution queues 234A-234D and can not be executed in time. Therefore, the priority should be applied.

Please note that, the priority may be adjustable according to a status of the memory system 20. In general, the default priority with an order from high to low may be metadata management 112B, user data access 112A, garbage collection 112D, and wear leveling control 112C. Since a status of the flash memory array 250 should always be updated in the metadata, metadata management 112B may have the highest priority in general. In some embodiments, if the free space in the flash memory array 250 is not enough for accessing user data or is less than a threshold, garbage collection 112D may have the highest priority. The physical driver 220 may perform erasing along with garbage collection 112D first, in order to reclaim the free space for the follow-up operation. In some embodiments, if the performance of the memory system 20 is important, user data access 112A may have the highest priority, to maintain a substantial throughput for the user. In practice, the priority can be determined in different ways to optimize the execution of the tasks. As mentioned above, there may be any number of task types and any manners for classification of the task types in a flash memory, and hence the priority should be determined accordingly, which is not limited herein.

Figure 5A:
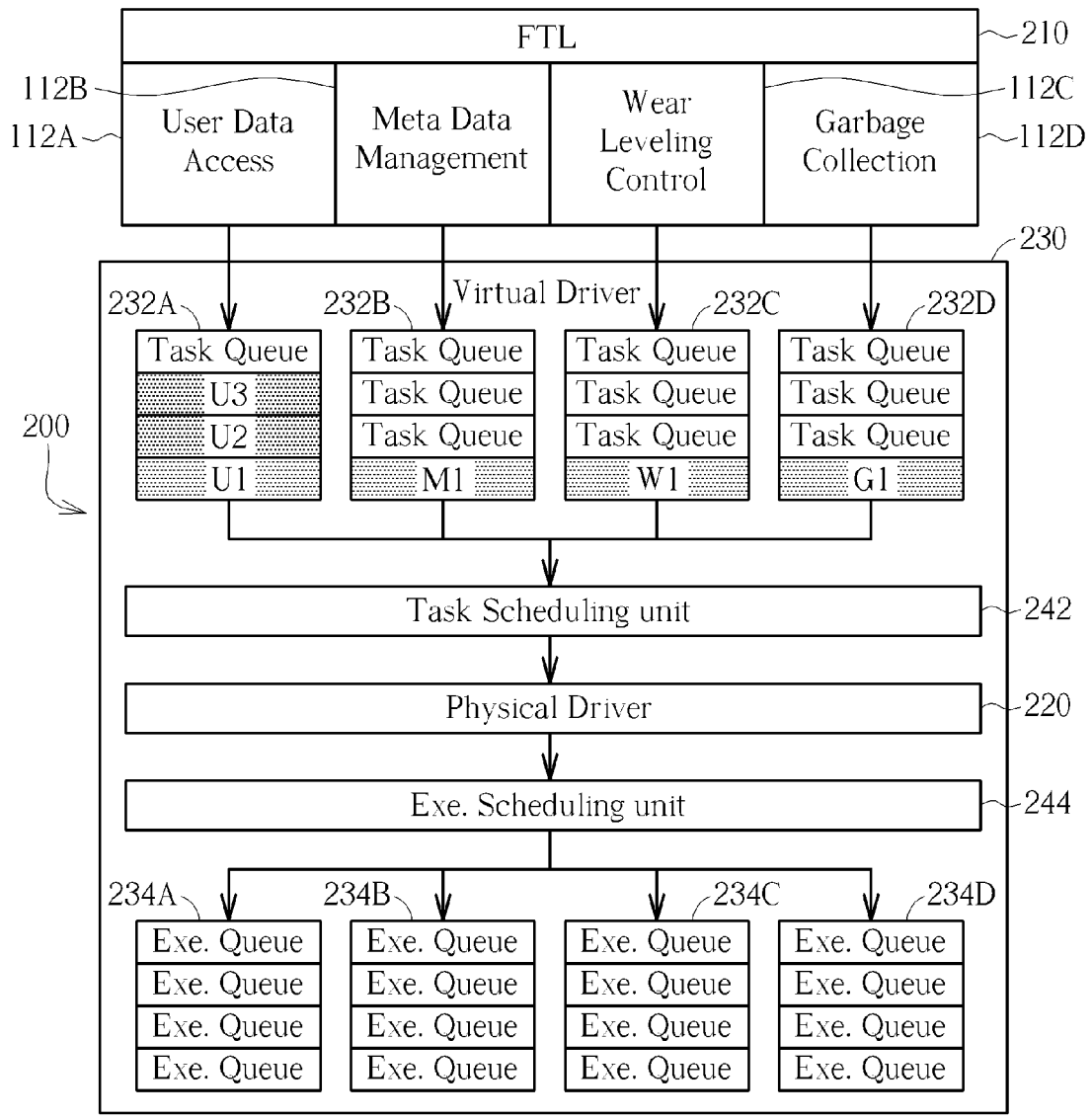
FIG. 5A is a schematic diagram of tasks stored in the task queues and to be converted into commands according to a priority according to an embodiment of the present invention.
Figure 5B:
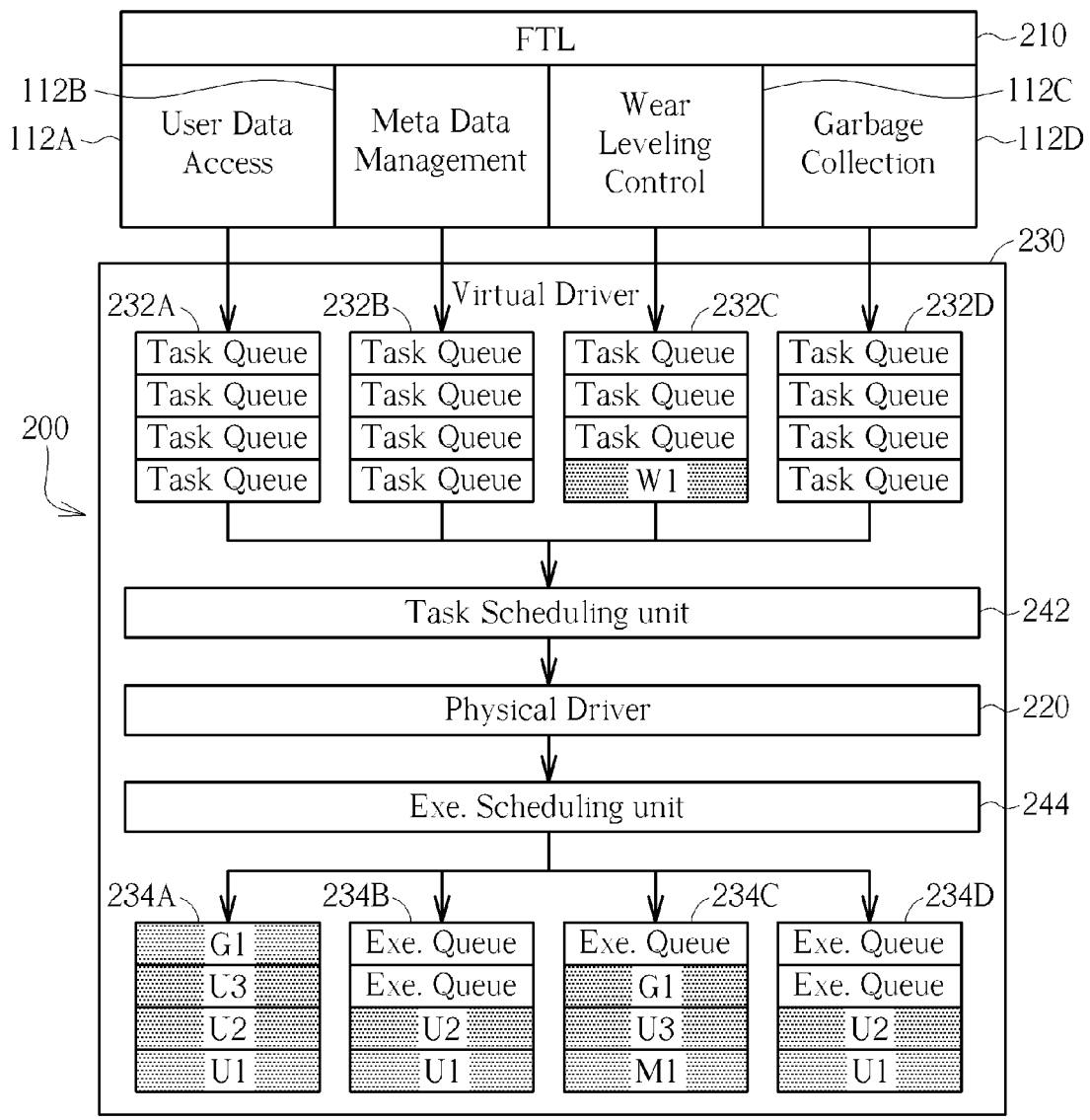
FIG. 5B is a schematic diagram of tasks converted into commands according to a priority according to an embodiment of the present invention.

Please refer to FIG. 5A, which is a schematic diagram of tasks stored in the task queues 232A-232D and to be converted into commands according to a priority according to an embodiment of the present invention. As shown in FIG. 5A, there are tasks U1-U3 of user data access 112A, a task M1 of metadata management 112B, a task W1 of wear leveling control, and a task G1 of garbage collection 112D stored in the task queues 232A-232D, respectively. Suppose the bandwidth of the memory system 20 is 16 MB/s, and the throughput occupied by each command is 4 MB/s, wherein each command is converted from a task among the task types 112A-112D by the task scheduling unit 242 according to the priority. Therefore, at most four commands can be executed successfully. In general, the bandwidth of 16 MB/s may be allocated to the four channels Ch0-Ch3 equally, and thus each channel is allocated with 4 MB/s, wherein only one command in each execution queue can be executed successfully. According to the priority in a default order (i.e. metadata management 112B, user data access 112A, garbage collection 112D, and wear leveling control 112C), the task M1 of metadata management 112B is converted into command(s) by the task scheduling unit 242 first and stored in the corresponding execution queue(s) among the execution queues 234A-234D. Then the tasks U1-U3 of user data access 112A and task G1 of garbage collection 112D are converted into commands and stored in the corresponding execution queues among the execution queues 234A-234D in order according to the priority and the requirements for these tasks to be executed in which memory/memories, as shown in FIG. 5B. At this moment, supposing that the task W1 of wear leveling control 112C is to be executed in the memory in Ch0 and should be allocated to the execution queue 234A but the capacity of the execution queue 234A has been fully occupied, the task W1 should wait in the task queue 232C until the capacity of the execution queue 234A is released.

Figure 5C:
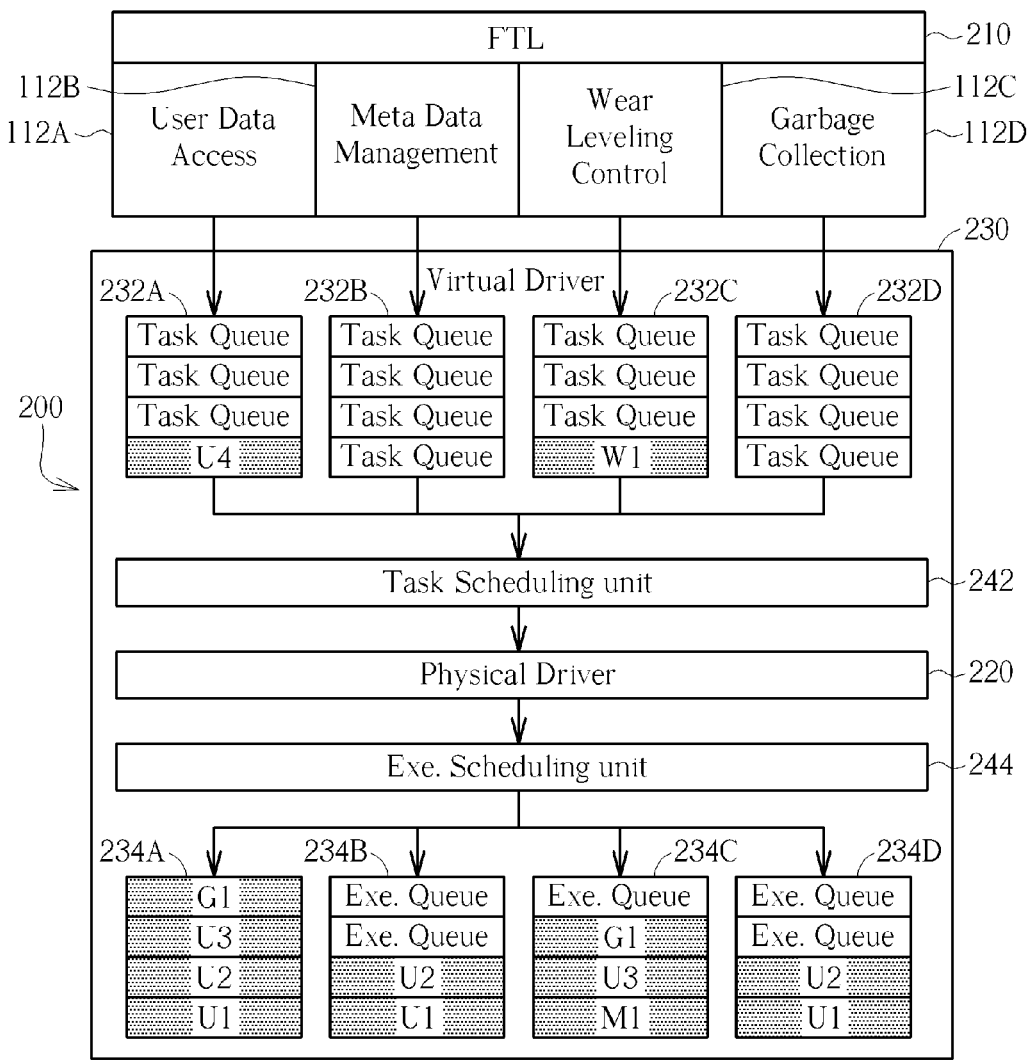
FIG. 5C is a schematic diagram of a new task arrives when several commands are executed and several tasks and several commands are waiting in the execution queues according to an embodiment of the present invention.
Figure 5D:
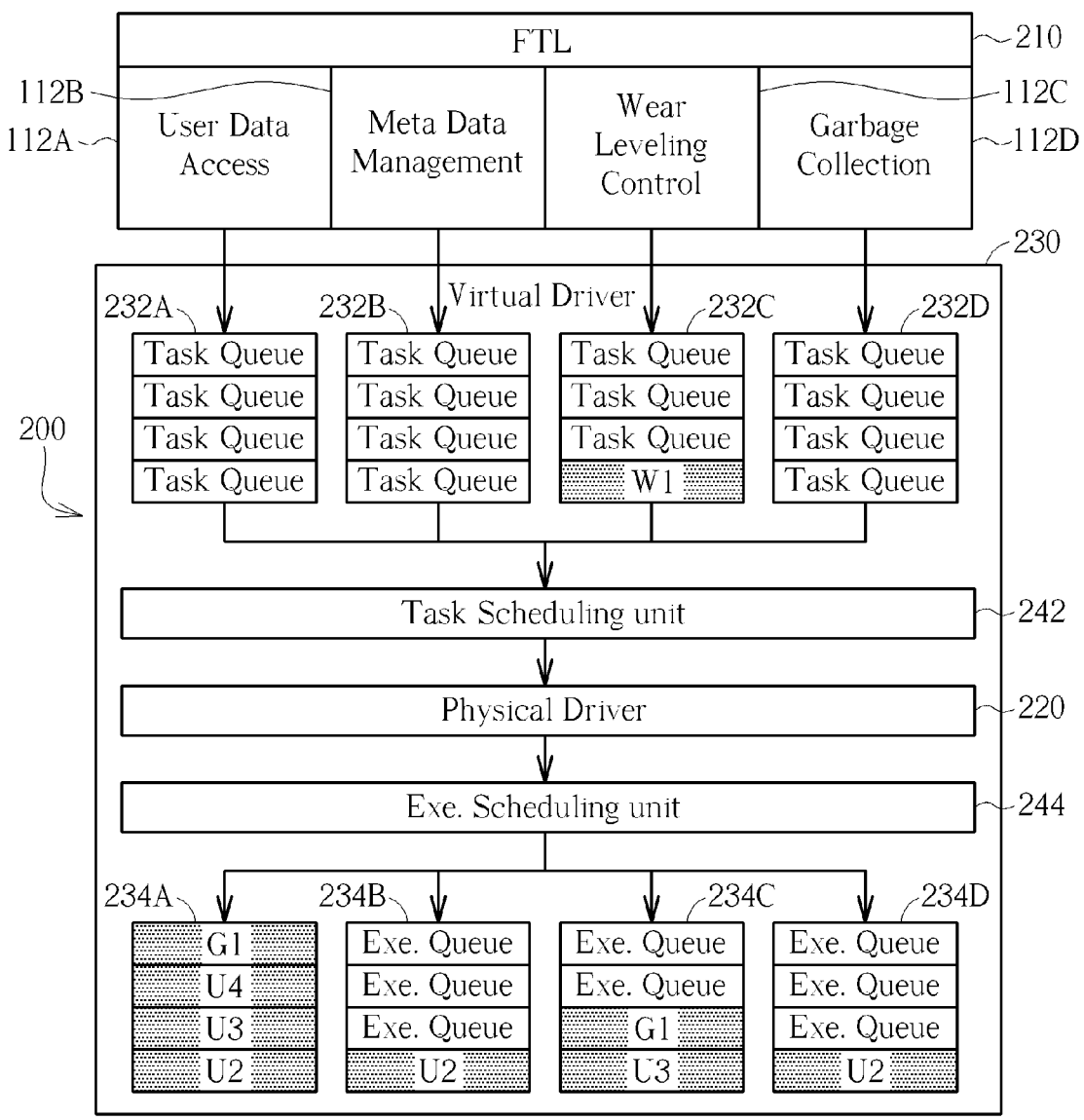
FIG. 5D is a schematic diagram of the task with a higher priority is converted into a command according to an embodiment of the present invention.

Each time a new task enters the task queues 232A-232D, the priority should be applied to the new task to execute the new task in an optimized order, so as to improve efficiency of the memory system 20. Please refer to FIG. 5C, which is a schematic diagram of a new task U4 arrives when several commands are executed and several tasks and several commands are waiting in the execution queues 234A-234D as the status of FIG. 5B. Supposing that the new arrival task U4 is of user data access 112A for the memory in the channel Ch0, the task U4 is therefore queued in the task queue 232A and to be converted to the execution queue 234A. At this moment, since the capacity of the execution queue 234A has been fully occupied, the tasks W1 and U4 may still wait in the task queues 232C and 232A, respectively. After the commands corresponding to the tasks in each execution queue have been complete (e.g. M1 and U1), the bandwidth is released and the capacity of the execution queues 234A-234D is also released; hence several tasks in the task queues 232A-232D can be converted into commands. At this moment, the task scheduling unit 242 may select the tasks in the task queues 232A-232D to be converted into commands according to the priority. Since the task W1 and the task U4 are both for memories in the channel Ch0, the task scheduling unit 242 should converts the tasks to the execution queue 234A according to the priority. Since the tasks of user data access 112A have a higher priority than those of wear leveling control 112C, even if the task U4 arrives the task queue later than the task W1, the task U4 may be converted into a command first and the task W1 will still stay in the task queue 232C, as shown in FIG. 5D. Furthermore, the order of the commands stored in the execution queues 234A-234D may also be interchangeable according to the priority. Therefore, the task U4 is converted into a command and stored ahead of the task G1 in the execution queue 234A, and will be executed after the execution of the tasks U2 and U3 are complete.

Figure 6:
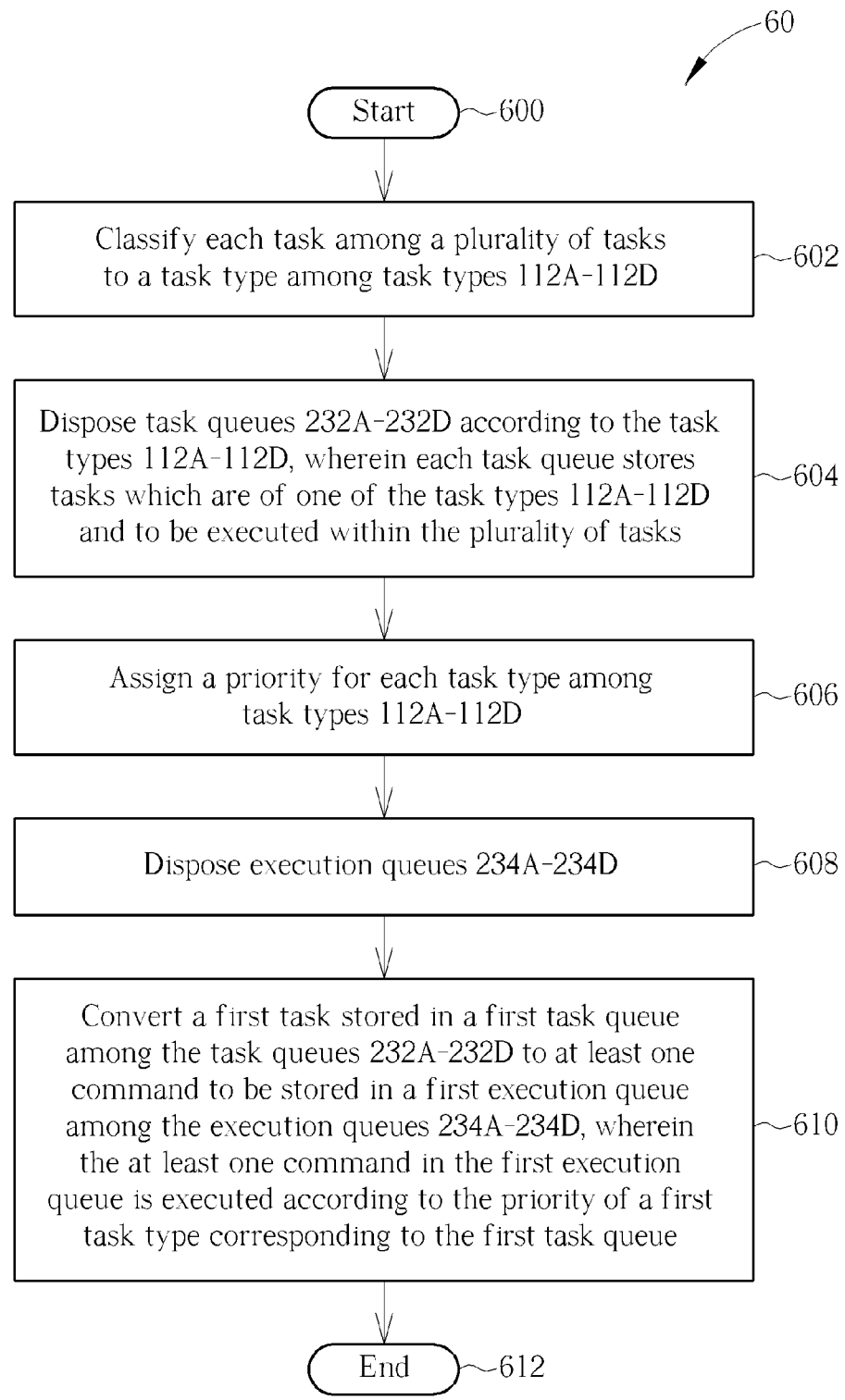
FIG. 6 is a schematic diagram of the memory control process according to an embodiment of the present invention.

A program is embodied in the memory controller 200 and executed by a processor to perform the abovementioned operation, which can be summarized into a memory control process 60, as shown in FIG. 6. The memory control process 60 includes the following steps:

Step 600: Start.

Step 602: Classify each task among a plurality of tasks to a task type among task types 112A-112D.

Step 604: Dispose task queues 232A-232D according to the task types 112A-112D, wherein each task queue stores tasks which are of one of the task types 112A-112D and to be executed within the plurality of tasks.

Step 606: Assign a priority for each task type among task types 112A-112D.

Step 608: Dispose execution queues 234A-234D.

Step 610: Convert a first task stored in a first task queue among the task queues 232A-232D into at least one command to be stored in a first execution queue among the execution queues 234A-234D, wherein the at least one command in the first execution queue is executed according to the priority of a first task type corresponding to the first task queue.

Step 612: End.

Please note that, the spirit of the present invention is to execute the plurality of tasks for a memory system in an optimized order, so as to improve efficiency of the memory system. Those skilled in the art can make modifications and alterations accordingly. For example, in the above embodiment, the method of scheduling tasks is utilized in the flash type memory system 20, but in some embodiments, any types of memory systems with memory controllers can also utilize the above scheduling method. On the other hand, as shown in FIG. 2-FIG. 5D, the capacity of tasks in each of the task queues 232A-232D and the capacity of commands in each of the execution queues 234A-234D are both 4 units, but in some embodiments, the task capacity or the command capacity may be different or modified according to system requirements, which is not limited herein. Furthermore, in some embodiments, the execution scheduling unit 244 may allocate the commands into the execution queue in any orders according to system requirements, and hence the commands queued in the execution queue may be executed for memories in any orders. In the following embodiment, the commands are executed in an interleaved way.

Figure 7:
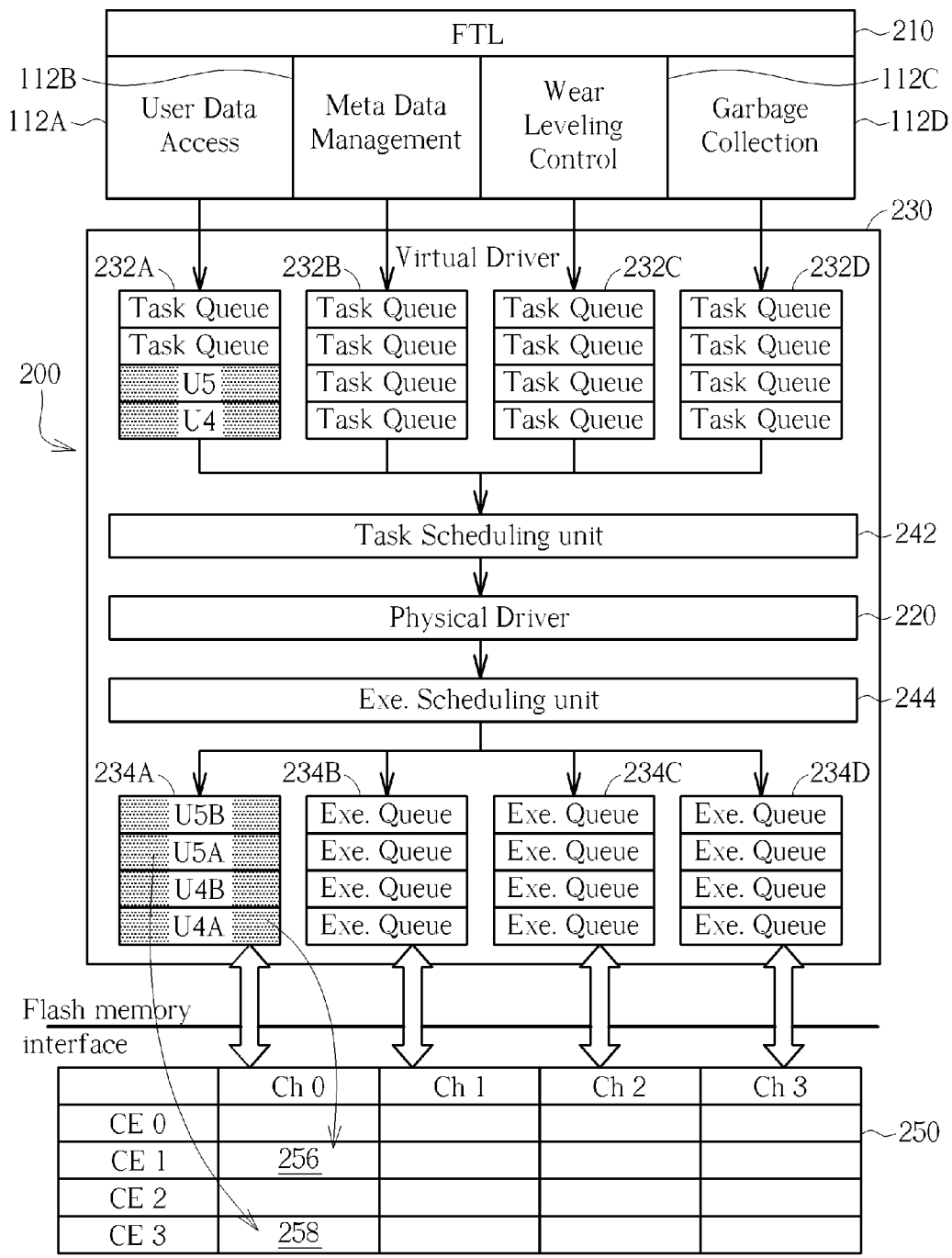
FIG. 7 is a schematic diagram of commands executed in an interleaved way according to an embodiment of the present invention.

Please refer to FIG. 7, which is a schematic diagram of commands executed in an interleaved way according to an embodiment of the present invention. As shown in FIG. 7, there are tasks U4 and U5 of user data access 112A stored in the task queue 232A. The task U4 is converted into commands U4A and U4B and will be executed for a memory space 256 located in the channel Ch0, and the task U5 is converted into commands U5A and U5B and will be executed for another memory space 258 also located in the channel Ch0. In such a condition, the physical driver 220 can execute the commands in an order of U4A, U5A, U4B, and U5B. In the period of the command U4A being executed for the memory space 256, even if the physical driver 220 finishes its work and is available for the follow-up commands, the memory space 256 may still be busy for data transfer. At this moment, the command U4B should wait until the memory space 256 is available and then can be executed. In order to achieve a higher efficiency, if the memory space 258 is available, the physical driver 220 can execute the command U5A first. As a result, the commands can be executed in the interleaved way, so as to achieve a higher efficiency of the memory system 20. In other embodiments, the tasks U4 and U5 can directly be divided into smaller tasks and then the smaller tasks are further converted into the commands U4A, U4B, U5A, and U5B, which can also be executed in the interleaved way.

In general, most of the flash memories define a specification of throughput, e.g. a class-4 flash memory defines a minimum throughput of 4 MB/s for user data access, and a class-6 flash memory defines a minimum throughput of 6 MB/s for user data access. In such a condition, the throughput of tasks of user data access 112A should be guaranteed to be greater than a target value. For example, in the above embodiment, the bandwidth of the memory system 20 is 10 MB/s. If a target throughput of user data access 112A is defined as 6 MB/s, there is only 4 MB/s bandwidth remained for tasks of the other task types to utilize. Therefore, a new criterion may be defined in this embodiment. If M+W+G<=4, all of the tasks in the tasks queues 232A-232D can be executed successfully. If M+W+G>4, several tasks should wait in the task queues and can not be executed in time. In such a condition, tasks of user data access 112A may be guaranteed to have a throughput greater than 6 MB/s. However, in some unusual cases, the throughput of user data access 112A may still fall below the target throughput if the bandwidth is occupied by some tasks which should be done urgently in the memory system 20.

In the prior art, when the physical driver is busy, a task should wait until the former task is complete and then can be executed. Therefore, the physical driver must finish the former task first and then can start to execute the follow-up task. As a result, efficiency may be reduced. In comparison, the present invention can assign a priority to a plurality of tasks to execute the plurality of tasks in an optimized order, so as to improve efficiency of the flash memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of scheduling a plurality of tasks for a plurality of memories in a memory system, the method comprising:
    classifying each task among the plurality of tasks to a task type among a plurality of task types;
    disposing a plurality of task queues according to the plurality of task types, each task queue storing tasks which are of one of the plurality of task types and to be executed within the plurality of tasks;
    assigning a priority for each task type among the plurality of task types;
    disposing at least one execution queue; and
    converting a first task stored in a first task queue among the plurality of task queues into at least one command to be stored in a first execution queue among the at least one execution queue;
    wherein the at least one command in the first execution queue is executed according to the priority of a first task type corresponding to the first task queue;
    wherein the first task is chosen according to the priority of the first task type corresponding to the first task queue when a sum of throughputs of all of the tasks in the plurality of tasks queues is greater than a bandwidth of the memory system.

2. The method of claim 1, wherein when a second task to be executed arrives, the second task is classified to a second task type among the plurality of task types and stored in a second task queue corresponding to the second task type.

3. The method of claim 2, further comprising converting the second task stored in the second task queue among the plurality of task queues into at least one command to be stored in a second execution queue among the at least one execution queue.

4. The method of claim 3, wherein the at least one command in the second execution queue is executed according to the priority of a second task type corresponding to the second task queue.

5. The method of claim 2, further comprising converting the second task stored in the second task queue among the plurality of task queues into at least one command to be stored in the first execution queue among the at least one execution queue.

6. The method of claim 5, wherein the priority of the second task is higher than the priority of the first task, the command converted from the second task is executed firstly, and then the command converted from the first task is executed.

7. The method of claim 1, further comprising defining a target throughput for one task type among the plurality of task types.

8. The method of claim 1, wherein each execution queue among the at least one execution queue corresponds to at least one memory.

9. The method of claim 8, wherein the at least one command is executed for memories in an interleaved way.

10. The method of claim 1, wherein the priority for each of the plurality of task types is defined according to a status of the memory system.

11. A memory system, comprising:
   a plurality of memories; and
   a memory controller, embodied a program executed by a processor to perform a method of scheduling a plurality of tasks for the plurality of memories in the memory system, the method comprising:
      classifying each task among the plurality of tasks to a task type among a plurality of task types;
      disposing a plurality of task queues according to the plurality of task types, each task queue storing tasks which are of one of the plurality of task types and to be executed within the plurality of tasks;
      assigning a priority for the each task type among the plurality of task types;
      disposing at least one execution queue; and
      converting a first task stored in a first task queue among the plurality of task queues into at least one command to be stored in a first execution queue among the at least one execution queue;
      wherein the at least one command in the first execution queue is executed according to the priority of a first task type corresponding to the first task queue;
   wherein the first task is chosen according to the priority of the first task type corresponding to the first task queue when a sum of throughputs of all of the tasks in the plurality of tasks queues is greater than a bandwidth of the memory system.

12. The memory system of claim 11, wherein when a second task to be executed arrives, the second task is classified to a second task type among the plurality of task types and stored in a second task queue corresponding to the second task type.

13. The memory system of claim 12, wherein the method further comprises:
   converting the second task stored in the second task queue among the plurality of task queues into at least one command to be stored in a second execution queue among the at least one execution queue.

14. The memory system of claim 13, wherein the at least one command in the second execution queue is executed according to the priority of a second task type corresponding to the second task queue.

15. The memory system of claim 12, wherein the method further comprises:
   converting the second task stored in the second task queue among the plurality of task queues into at least one command to be stored in the first execution queue among the at least one execution queue.

16. The memory system of claim 15, wherein the priority of the second task is higher than the priority of the first task, the command converted from the second task is executed firstly, and then the command converted from the first task is executed.

17. The memory system of claim 11, wherein the method further comprises:
   defining a target throughput for one task type among the plurality of task types.

18. The memory system of claim 11, wherein each execution queue among the at least one execution queue corresponds to at least one memory.

19. The memory system of claim 18, wherein the at least one command is executed for memories in an interleaved way.

20. The memory system of claim 11, wherein the priority for each of the plurality of task types is defined according to a status of the memory system.

21. A method of scheduling a plurality of tasks for a plurality of memories in a memory system, the method comprising:
   receiving a task;
   determining a task type of the task;
   queuing the task in a corresponding task queue according to the task type of the task;
   giving a priority to the task according to the task type of the task when a sum of throughputs of a plurality of tasks in a plurality of tasks queues is greater than a bandwidth of the memory system;
   converting the task into at least one command according to the priority of the task; and
   queuing the at least one command converted from the task in a corresponding execution queue according to the priority of the task.

* * * * *